UNITED STATES PATENT OFFICE.

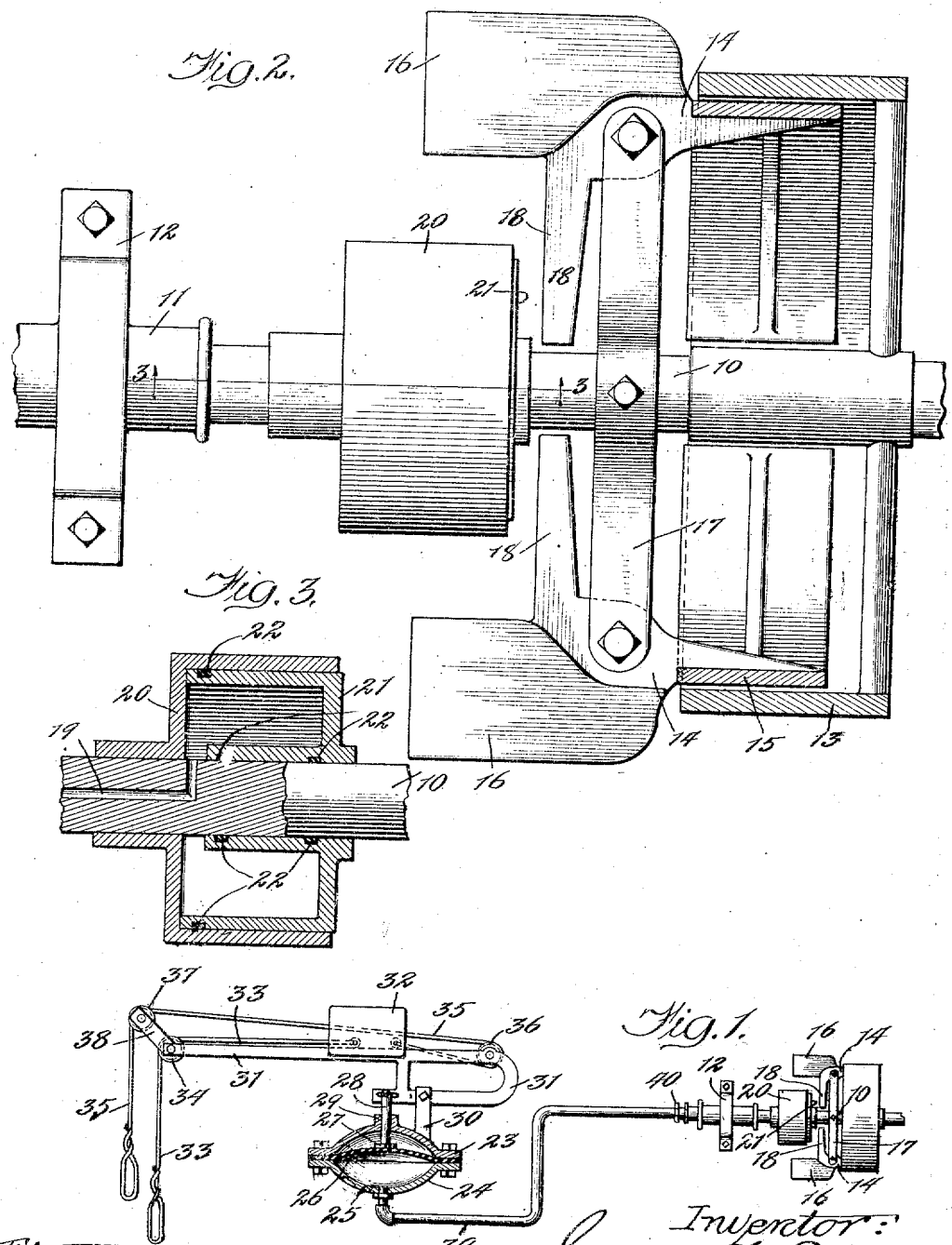

GEORGE F. LEIGER, OF CHICAGO, ILLINOIS.

SPEED-REGULATING MECHANISM.

No. 857,637.

Specification of Letters Patent.

Patented June 25, 1907.

Application filed March 11, 1907. Serial No. 361,674.

*To all whom it may concern:*

Be it known that I, GEORGE F. LEIGER, a citizen of the United States, residing at Chicago, in the county of Cook, State of Illinois, have invented certain new and useful Improvements in Speed-Regulating Mechanism, of which the following is a specification, reference being had to the accompanying drawings.

My invention relates to speed regulating mechanism for shafts and similarly rotating members, and its object is to provide a new and improved means by which the rotating speed of a driven member may be regulated. More particularly, its object is to provide mechanism controlled by fluid pressure by means of which the speed of rotation of a rotating member, when once it attains a given speed of rotation, may be automatically maintained at and be prevented from exceeding that predetermined speed, regardless of temporary excesses of speed in the driving member or mechanism; to provide fluid pressure controlled mechanism by means of which the mechanism may be readily and conveniently regulated to adjust it for any predetermined speed, and by means of which the speed of the driven member may be varied at pleasure to any speed up to the speed of the driving member, and may be automatically maintained at any such speed.

To that end my invention consists broadly in a pulley or similar revoluble member which may be either a driving or a driven pulley, a shaft upon which said pulley is loosely mounted, clutch members adapted to effect an engagement between said pulley and said shaft, a cylinder on said shaft, a piston slidingly mounted on said shaft in said cylinder and adapted to be operated by fluid pressure to cause the clutch members to effect an engagement between said pulley and said shaft at any desired pressure, centrifugally operated members adapted to throw such clutch members out of engagement against the action of said fluid pressure when a predetermined speed of rotation is reached, and means by which while the machine is running the degree of pressure of the said fluid operated piston upon such clutch-members may be varied at will and adjusted for any predetermined speed by means of applying various degrees of pressure upon a compressible chamber.

In the drawings:—Figure 1 is a side elevation of the machine. Fig. 2 is a side elevation, partly in section, of the parts mounted on the shaft. Fig. 3 is a detail, being a cross-section taken at line 3 3 of Fig. 2.

Referring to the drawings, in which corresponding parts are indicated by like reference characters, 10 indicates a shaft which is shown as broken off at one end and supported at the other end in a bearing 11 which is held in a bearing-block 12 which may be supported in any suitable manner. 13 indicates a pulley journaled on said shaft, the inner surface of the rim of said pulley being adapted to engage the clutch-members hereinafter described.

14 indicates levers each provided at one end with a clutch-member 15 and at the other end with a weight 16, one of such levers being pivoted at each end of a support 17 which is keyed or otherwise non-rotatably secured upon shaft 10. Each of said levers 14 is provided with an arm 18 which projects inward toward the shaft 10.

As shown in Fig. 3, the shaft 10 is provided with a central opening 19, which turns at right angles and communicates with the interior of a cylinder 20 which is secured fluid-tight upon the shaft 10 and so as to rotate therewith. 21 indicates a piston slidingly mounted on said shaft 10 and provided with packing-strips 22 between it and the cylinder 20 and between it and the shaft 10.

It will be evident that when water, or other fluid, is forced into the cylinder 20, the piston 21 will be forced out of the cylinder against the arms 18 and will tend to force said arms toward the support 17, thus moving the weights 16 inward and the clutch-members 15 outward toward and against the inner surface of the rim of the pulley 13. This causes an engagement between shaft 10 and pulley 13, the strength of the engagement depending upon the force of the fluid pressure in the cylinder, as will be readily understood. It is evident, moreover, that if the shaft 10 is rotated, or if the pulley 13 is rotated while such fluid pressure is being applied to the cylinder to cause engagement between the shaft and said pulley 13, the weights 16 will have a tendency by centrifugal force to cause the clutch-members to be disengaged from the pulley 13, and the magnitude of this force will be dependent upon the speed of rotation, as is well-known.

Referring to Fig. 1, 23 24 indicate the two parts of a casing which incloses a chamber 25. This casing and the mechanism connected with it may be supported in any suitable manner. 26 indicates a flexible diaphragm clamped between the two parts 23 24 in such manner that the part of the chamber 25 between the diaphragm 26 and the casing-member 24 shall be fluid-tight. This diaphragm 26 is preferably of rubber belting material, but it may be constructed of any suitable flexible material. 27 indicates a plate suitably mounted on a rod 28 slidingly mounted in a bearing 29 in the casing-member 23. 30 indicates an arm rising from the casing-member 23. Pivoted to the upper end of this arm 30 is a lever 31, which lever is also pivotally attached to the upper end of the rod 28. As shown in Fig. 1, the upper surface of this lever is adapted to support a weight 32 adapted to be slid along such upper surface of the lever. Attached to the forward end of the weight 32 is a suitable cord 33 which passes over a pulley 34 mounted on the forward end of the lever 31. Attached to the other end of the weight 32 is another cord 35 which passes over a pulley 36 mounted on the rear end of the lever 31, and thence over a pulley 37 mounted on the upper end of an arm 38 rising from the forward end of the lever 31. It will be evident that by means of the cords just described, the weight 32 can be shifted back and forth along the lever 31 so as to cause the plate 27 to bear with various degrees of force upon the flexible diaphragm 26.

39 indicates a pipe leading from the chamber 25 and being connected, by means of any suitable form of stuffing-box 40, with the opening 19 in the shaft 10, to provide fluid-tight connections between the chamber 25 and the cylinder 20, as will be understood. The stuffing-box 40 is to be so constructed, of course, as to reduce to a minimum the friction between the pipe 39 and the shaft 10.

The piston 21 being clear of the arms 18, and the weight 32 being shifted to relieve the diaphragm 26 of any pressure from the plate 27, the chamber between the diaphragm 26 and the casing-member 24, and the cylinder 20, together with the connecting pipes, are filled with water or some other practically incompressible fluid. The machine is then ready for operation.

We will suppose, for illustration, that the pulley 13 is the member driven from any suitable source of power. The speed at which the shaft 10 is desired to be run being then decided upon, the weight 32 is shifted upon the lever 31 to cause the piston 21 to press with just the required amount of force against the arms 18 to effect the proper engagement for that predetermined speed of rotation between the clutch members and the pulley 13, and to overcome the centrifugal force of the weights 16 at such speed. It is evident, of course, that if such predetermined speed is exceeded by the driving member,—which in this case is the pulley,—the force of the piston 21 will be overcome, in part, by the increased centrifugal force of the weights 16, and the force of the engagement between the clutch-members and the pulley 13 will be lessened sufficiently to prevent the speed of rotation of the driven member,—the shaft,—from rising appreciably above the predetermined desired speed.

It will be understood, of course, that if the speed of the driven member is to be increased, all that is necessary to effect this while the machine is running is to shift the weight 32 forward on the lever 31. thereby increasing the force of the piston against the arms 18 and consequently increasing the force of the engagement between the clutch-members and the pulley, to overcome which increased force of engagement of the clutch-members requires greater centrifugal force and consequently higher speed. It is likewise evident that if the weight 32 is shifted toward the fulcrum of the lever 31, the centrifugal force of the weights 16 will overcome the pressure of the piston 21 against the arms 18 at a lower rate of speed and will prevent the driven member exceeding such lower rate of speed by the resultant lessening of the force of the engagement between the clutch-members and the pulley 13.

By my invention I have provided improved mechanism adapted to the operation of any machine which is driven by a continuously running line shaft and whose speed it may be desired to automatically maintain at any desired point or to vary at will while the machine is running. My mechanism is also peculiarly adapted to the operation of electrical generators driven by gas engines, especially such as are used for sparking, for instance, in automobiles, and to other mechanisms adapted to be driven by gas engines whose speed often temporarily exceeds the speed at which the generator is desired or adapted to be run. It may of course, however, be used in any mechanism in which it is desired that the speed of the driven shaft shall be automatically prevented from exceeding a predetermined rate of revolution, and in any mechanism whose speed it is desired while the machine is running to vary and to automatically maintain as long as desired at any given point.

What I claim as my invention and desire to secure by Letters Patent is:—

1. The combination with a shaft, a loose pulley on said shaft, and a clutch-member adapted to effect an engagement between said shaft and said pulley, of a cylinder on said shaft, a piston in said cylinder adapted to be operated by fluid pressure to cause said clutch-member to effect an engagement between said shaft and said pulley, and centrifugally operated mechanism adapted to weaken the force of the engagement between said shaft and said pulley when a predetermined speed of rotation is passed.

2. The combination with a shaft, a loose pulley on said shaft, a clutch-member adapted to effect an engagement between said shaft and said pulley, and fluid-operated mechanism adapted to cause said clutch-member to effect an engagement between said shaft and said pulley, of a compressible chamber communicating with said fluid-operated mechanism, means for applying a varied amount of pressure upon said compressible chamber, and centrifugally operated mechanism adapted to weaken the force of the engagement between said shaft and said pulley when a predetermined speed of rotation is passed.

3. The combination with a shaft, a loose pulley on said shaft, a clutch-member adapted to effect an engagement between said shaft and said pulley, and fluid-operated mechanism adapted to cause said clutch-member to effect an engagement between said shaft and said pulley, of a compressible chamber communicating with said fluid-operated mechanism, a lever bearing on said compressible chamber, a weight slidingly mounted on said lever and adapted to apply pressure to said compressible chamber, and centrifugally operated mechanism adapted to weaken the force of the engagement between said shaft and said pulley when a predetermined speed of rotation is passed.

4. The combination with a shaft, a loose pulley on said shaft, a clutch-member adapted to effect an engagement between said shaft and said pulley, and fluid-operated mechanism adapted to cause said clutch-member to effect an engagement between said shaft and said pulley, of a compressible chamber communicating with said fluid-operated mechanism, said chamber being formed of a rigid casing member and a flexible diaphragm, a plate bearing on said flexible diaphragm, a lever bearing on said plate, a weight slidingly mounted on said lever and adapted to apply pressure to said diaphragm, and centrifugally operated mechanism adapted to weaken the force of the engagement between said shaft and said pulley when a predetermined speed of rotation is passed.

GEORGE F. LEIGER.

Witnesses:
HENRY P. GALE,
WILLIAM H. DE BUSK.